United States Patent [19]

Judd

[11] 4,065,289

[45] Dec. 27, 1977

[54] METHOD OF MAKING SOLID FERTILIZER HERBICIDE GRANULES

[75] Inventor: David John Judd, St. Albans, England

[73] Assignee: Murphy Chemical Limited, St. Albans, England

[21] Appl. No.: 396,404

[22] Filed: Sept. 12, 1973

Related U.S. Application Data

[63] Continuation of Ser. No. 164,461, July 20, 1971, abandoned.

[30] Foreign Application Priority Data

July 24, 1970 United Kingdom .............. 36111/70
July 12, 1971 United Kingdom .............. 36111/71

[51] Int. Cl.$^2$ .............................................. A01N 13/00
[52] U.S. Cl. ............................................. 71/82; 71/83; 71/84; 71/93; 71/97; 71/106; 71/111; 71/118; 71/120; 71/DIG. 1
[58] Field of Search ..................... 71/DIG. 1, 93, 111, 71/118, 106, 83, 90

[56] References Cited

U.S. PATENT DOCUMENTS

| 2,792,295 | 5/1957 | Wright | 71/DIG. 1 |
|---|---|---|---|
| 2,992,090 | 7/1961 | Littler | 71/DIG. 1 |
| 3,062,637 | 11/1962 | Marples et al. | 71/DIG. 1 |
| 3,154,397 | 10/1964 | Martin | 71/DIG. 1 |
| 3,274,052 | 9/1966 | Yaffe et al. | 424/278 |
| 3,453,318 | 7/1969 | Pianka | 71/106 |
| 3,585,022 | 6/1971 | Gray, Jr. | 71/65 |

FOREIGN PATENT DOCUMENTS

| 604,497 | 9/1960 | Canada | 71/DIG. 1 |
|---|---|---|---|
| 898,915 | 6/1962 | United Kingdom | 71/DIG. 1 |
| 954,194 | 4/1964 | United Kingdom | 71/DIG. 1 |

OTHER PUBLICATIONS

Weed Sci., "Common and Chemical Names of Herbicides", (1969), Weed Science, vol. 17, p. 613, (1969).

*Primary Examiner*—Glennon H. Hollrah
*Attorney, Agent, or Firm*—Bacon & Thomas

[57] ABSTRACT

A herbicidal composition containing a plant fertilizer component comprising a coherent extrudate containing an intimate dispersion of (A) 1 to 100 parts by weight of a plant fertilizer component; and (B) one part by weight of a herbicide component having a melting or softening point below 145° C and below that of component (A) when mixed therewith said component (B) also having a solubility in water not exceeding 1g/liter at 20° C. whereby release of said fertilizer component from said extrudate in use thereof is retarded.

11 Claims, No Drawings

METHOD OF MAKING SOLID FERTILIZER HERBICIDE GRANULES

This is a continuation of application Ser. No. 164,461 filed July 20, 1971 now abandoned.

This invention relates to improvements in herbicidal compositions, and more particularly to compositions containing a fertilizer component and a herbicide component.

In many areas, soil is deficient in one or more of the natural nutrients required for satisfactory growth of certain crops. As a result such crops do not give their optimum yield. When such conditions pertain, it is a common procedure to apply a fertilizer rich in the required nutrient(s). However, a common effect of this procedure is that many weeds benefit from the enrichment of the soil to such an extent that they become a serious hindrance. It is among the objects of the invention to provide a composition which may be used to promote growth of a desired plant species, while retarding growth of weed species.

According to one aspect of the invention there is provided a composition in the form of a coherent extrudate containing an intimate dispersion of (A) a plant fertilizer component; and (B) an equal or lesser weight of a herbicide component having a melting or softening point below that of component (A) when mixed therewith and such as to permit extrusion of a mixture of said component A and B to form self-cohesive pellets said component (B) also having a solubility in water not exceeding 1g/liter at 20° whereby release of said fertilizer component from said extrudate in use thereof is retarded.

Optionally one or more pesticides (e.g. fungicides, soil insecticides, or nematocides) are included in the composition.

In the composition according to the invention, the physical as well as the chemical properties of the components A and B are of great importance. By suitable choice of these physical properties as hereinafter set out, the composition can not only be provided in a particularly convenient physical form (i.e. an extrudate), but release of the fertilizer component in the soil is retarded, and thus this component may be utilized with greater efficiency by the crop plants.

There are thus, two notable and unexpected advantages in mixing the components A and B of the composition according to the invention, as opposed to providing them for separate application to the soil, quite apart from the much greater convenience of the combined formulation.

The fertilizer component (A) will generally contain a source of available nitrogen. A fertilizer component of particular interest is urea, but other compounds such as ammonium salts (e.g. ammonium nitrate, ammonium sulphate, ammonium chloride or ammonium phosphates), nitrates (e.g. ammonium nitrate, calcium nitrate, sodium nitrate or potassium nitrate) or substituted ureas (e.g. urea-aldehyde condensates or methylene ureas) may also be employed.

The fertilizer component will often contain a source of available phosphorus e.g. in the form of an inorganic phosphate such as an ammonium phosphate or a potassium phosphate. A source of available potassium may also be included, e.g. as potassium nitrate, a potassium phosphate, potassium sulphate, or potassium chloride.

The fertilizer component may include trace elements necessary for satisfactory crop growth, which are sometimes deficient in the soil. Examples are zinc, iron, copper, cobalt, molybdenum, manganese, and boron. Such trace elements may be present as their salts, or as anions such as borate or molybdate or as a complex. For example, iron may be present as a complex with ethylenediamine tetraacetic acid.

The herbicide component will generally be a pre-emergence herbicide. The herbicide may for example be selected from among compounds of the general formula

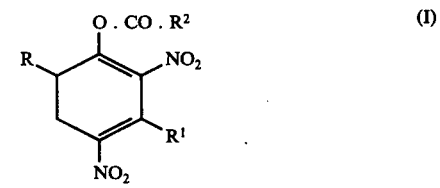

(I)

in which R is a branched butyl group, $R^1$ is a hydrogen atom or a methyl group and $R^2$ is a group $R^3$ or $-CH=CH-CO_2R^3$ where $R^3$ is an alkyl, alkenyl or aryl group containing from 1 - 6 carbon atoms which may optionally be substituted with a halogen atom, an alkoxyl group or a substituted amino group.

A herbicide of general formula (I) of particular interest is 2-tert-butyl-4,6-dinitro-5-methylphenyl acetate. Other useful herbicides of general formula (I) include 2-tert-butyl-4,6-dinitrophenyl acetate and 2-tert-butyl-4,6-dinitrophenyl ethyl fumarate. The preparation and herbicidal properties of such compounds have been disclosed in our British Pat. Nos. 999,876 and 1,080,282.

Other useful herbicides include 3-(4-bromo-3-chlorophenyl)-1-methoxy-1-methylurea (chlorbromuron) and related compounds of similar structure such as 3-(3,4-dichlorophenyl)-1-methoxy-1-methylurea (linuron) and 3-(4-chlorophenyl)-1-methoxy-1-methylurea (monolinuron); isopropyl N-phenylcarbamate (propham), 2-chloro-N-isopropyl-acetanilide (propachlor) and triazine herbicides of the general formula:

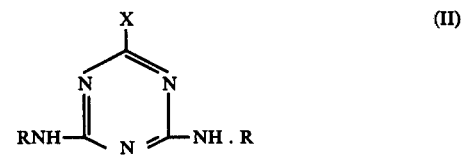

(II)

where X is OR or SR and R is a lower alkyl group. The R groups may be the same or different; (e.g. ametryne, desmetryne or prometryne).

In order to facilitate extrusion of the mixture of components (A) and (B), the herbicide component when mixed with the fertilizer component should have a melting point or softening point lower than the pure fertilizer component. During extrusion of the mixture, the herbicide component softens and flows, thus lubricating the extrusion process permitting the production of stable pellets, and coating the particles of fertilizer components so that their release into the soil is retarded.

On the one hand, the melting point of the herbicide component should generally be above ambient temperature, since the use of a liquid herbicide is liable to result in the production of a soft extrudate which may crumble or cake during transport. It should be remembered that the softening point of the herbicide component may be lowered by contamination by the fertilizer component, and it is normally preferred that the mixed melting point so obtained is above ambient temperature. However, a sufficiently low proportion e.g. 8% or less, and preferably 5% or less, of a low-melting herbicide can result in the production of hard pellets, e.g. by using a die having a length:diameter ratio, as discussed below, of 11:1.

On the other hand, the melting or softening point of the herbicide component should not be too high. Even if the fertilizer component melts at a still higher temperature, the use of high melting herbicides causes difficulty during the extrusion process. Preferably the herbicide components should have a melting or softening point below 145° C, e.g. below 110° C.

The herbicide component will be sparingly soluble in water, that is it should have a solubility of less than about 1 gram/liter at 20° C.

The proportion of the components (A) and (B) may be varied over a wide range, e.g. from 1:1 to 100:1, preferably 1:1-30:1, e.g. 10:1-40:1 or 4:1-15:1.

The composition may contain minor proportions of other components. For example, it may be desired to reduce the rate of release of the fertilizer and herbicide components still further, in which case an anti-solubilising agent may be included in the extrudate. When particularly hygroscopic fertilizer components are employed, it may be desirable to include an anti-caking agent in the composition, e.g. a suitable surfactant. However, it is not necessary to include any bonding agent or sticking agent, in distinction to various prior proposals which have involved the sticking of a herbicide component to a granular fertilizer component.

The composition according to the invention may be manufactured according to a further feature of the invention, by forming a mixture of components A and B in particulate form and extruding the mixture under conditions such that flow of the herbicide component occurs. If desired, a proportion of water may be added to the composition to aid the extrusion process, but this is not in general desirable since the water must subsequently be removed from the extrudate by a drying process.

Various forms of apparatus suitable for forming extrudates, including the extrudate according to this invention, are known. They all work on the principle of forcing the material to be extruded through apertures (generally circular) in a die. In some apparatus of this type, the die is in the form of an annular shell having a plurality of radial apertures, and the material to be extruded is pressed against this shell, either on the inside or outside thereof, by rollers, and the resulting extrudate is separated from the shell by knives placed either or the outside or inside thereof respectively.

In an apparatus of this type, there are various possibilities for feeding the material through the die. Thus, the die may be stationary and rollers may rotate internally of the die, or alternatively both die and roller may rotate in contact, the roller being either inside or outside the die.

In an alternative form of apparatus, the material to be granulated is forced by a feed-screw through a stationary die plate, and the extrudate is chopped to a determined length by rotating knives.

The ratio of length to diameter of the die holes is of great importance in the extruding process. In general, the higher this ratio, the more frictional heat is generated during extrusion, and it will often be found that with a sufficiently high ratio of length to diameter it is not necessary to supply any additional heat to cause the required flow of the herbicide component. Thus, it is preferred to use dies having a length to diameter ratio in the range 1:1 to 15:1 e.g. 8:1 to 12:1. The considerable pressure generated in the die aids in causing flow of the herbicide component, and it is not in general necessary for the material being extruded to reach the melting point of the herbicide, as determined at atmospheric pressure in the pure state. The extrusion temperatures may e.g. be in the range 50°–145° C generally 70°–145° C. Advantageously the extrusion temperature is in the range 75°–95° C, e.g. 80°–90° C.

The overall size of the extrudate may be varied within a wide range by altering the die employed. For example, both diameter and length may vary in the range 0.5 to 10mm, preferably in the range 1.5 to 5mm.

When dies having a low length to diameter ratio are employed, it may be necessary to add a small proportion e.g. 0.5–10 weight % of water or other volatile liquid to the material to be extruded, in order to achieve an extrudate of the required hardness and friability. However, this has the disadvantage that the resulting extrudate must be dried to achieve these properties.

Pelletising apparatus useful for preparing the composif this invention is made, for example, for the following manufacturers:- R. A. Lister & Son Ltd., Cinderford, Gloucestershire, England; Simon-Barron Ltd., Bristol Road, Gloucester, England; Richard Sizer Ltd., Wilmington, Hull, England; Sprout, Waldron & Co. Inc., Muncy, Pa., U.S.A.; Hutt GmbH, 7105 Leingarten-Beilbronn, West Germany; and Alexanderwerk Aktiengesellschaft, 5630 Remscheid, West Germany.

The granules of the invention may be used to nourish and protect from weeds such temperate crops as sugar beet, cereals or leguminosae, and such tropical crops as sorghum (*Sorghum vulgare*) and other millets. Typical temperate weeds that will be retarded or eradicated by use of these gramules include fat hen (*Chenopodium album*), groundsel (*Senecio vulgaris*) and chickweed (*Stellaria media*). An example of a tropical weed that is controlled by the granules of the invention is *Striga Sp.*, a weed partially parasitic upon sorghum that causes considerable crop damage, for example in Nigeria.

Thus a further aspect of the present invention provides a method of supplying fertilizer to a crop while controlling weeds therein which comprises applying to said crop before or after emergence thereof or to the soil before sowing of said crop, an effective amount of the composition defined herein.

The rate of application of the granules will be selected in relation to the intended herbicidal and fertilising effect, taking into account the composition of the granules, the crop, the nature of the soil, the weather, etc: At low application rates, particularly with large granules, it is advantageous to crush or otherwise subdivide the granules before application in order to obtain a more even distribution.

The following examples serve only to illustrate the invention, N.P.K. ratios are expressed as $N:P_2O_5:K_2O$ and all percentages are by weight.

EXAMPLE 1

Urea (94 kg) and 2-t-butyl-4,6-dinitro-5-methylphenyl acetate (6 kg) both in crystalline granular form were passed through a 10 mesh (B.S.) screen and subsequently mixed together. The mixture was then passed through a Lister pelletizer with a die hole length to diameter ratio of 11:1. The resulting pellets had a diameter of 2.5mm and a length of approximately 2.5mm and contained 6% herbicide and 94% fertilizer.

EXAMPLE 2

Urea (approximately 10gms) and 2-t-butyl-4,6-dinitro-5-methylphenyl acetate (6 gms) were ground together in a mill. The resulting mixture was added to urea (approximately 84gms), mixed further and passed through a Lister pelletizer to give a product similar to that described in Example 1.

EXAMPLE 3

Urea (26.82 kg), potassium nitrate (34.54 kg), and mono ammonium phosphate (32.64 kg) were ground together dry in a mill. Approximately 10% of the resulting mixture was ground together with 2-t-butyl-4,6-dinitro-5-methylphenyl acetate (6.0 kg). This mixture was then mixed with the remaining fertilizer component and passed through a Lister pelletizer. The resulting granules had an approximate N:P:K ratio of 22:21:17 and a diameter of 2.5mm.

EXAMPLE 4

2-t-Butyl-4,6-dinitro-5-methylphenyl acetate (60gm) and urea (185gm) were ground in a mill. Urea (55gm) and water (130 ml) were added to the mixture and the whole mixed before passing it through a Lister pelletizer. The resulting pellets were dried to remove the water to yield granules 2.5mm in diameter containing 6% herbicide and 94% fertilizer.

EXAMPLE 5

Urea (26.82gm), potassium nitrate (34.54gm), and monoammonium phosphate (32.64gm) were mixed together. Twenty percent of the mixture was added to 2-t-butyl-4,6-dinitro-phenyl acetate (6.0gm) and the components ground together in a mill. This was added to the bulk of the fertilizer and then 3 ml of water was added. The damp mix was then passed through a Lister pelletizer to produce granules 1mm in diameter which were then dried. The resulting granules were 1mm in diameter and contained 6% herbicide and 94% fertilizer with an approximate N:P:K ratio of 22:21:17.

EXAMPLE 6

Urea (10 kg) and 2-ethylamino-4-isopropylamino-6-methylthio-1,3,5-triazine (ametryne; 6 kg) were ground together in a mill. The resulting mixture was added to a further quantity of urea (84 kg), mixed further and passed through a Lister pelletizer to give a product similar to that described in Example 1.

EXAMPLE 7

Example 3 was repeated except that 2-t-butyl-4,6-dinitro-5-methylphenyl acetate was replaced by an equal weight of 2-ethylamino-4-isoproylamino-6-methylthio-1,3,5-triazine. The resultant granules had an approximate N:P:K ratio of 22:21:17 and a diameter of 2.5 mm.

EXAMPLE 8

Urea (94 kg) and 3-(4-bromo-3-chlorophenyl)-1-methoxy-1-methylurea (chlorbromuron; 6 kg) were both passed through a 10 mesh (B.S.) screen and subsequently mixed together. The mixture was then passed through a Lister pelletizer. The resulting pellets had a diameter of 2.5 mm and contained 6% herbicide and 94% fertilizer.

EXAMPLE 9

Example 3 was repeated except that 2-t-butyl-4,6-dinitro-5-methylphenyl acetate was replace by an equal weight of chlorbromuron. The resultant granules had an approximate N:P:K ratio of 22:21:17 and a diameter of 2.5 mm.

I claim:
1. A method of making a plant fertilizer-herbicide composition which comprises:
  a. making a dry mixture of 1 to 100 parts by weight of a plant fertilizer component (A) selected from the group consisting of urea, ammonium nitrate, ammonium sulphate, ammonium chloride, ammonium phosphate, calcium nitrate, sodium nitrate, potassium nitrate, urea-aldehyde condensates, methylene ureas and mixtures thereof with ammonium phosphate, potassium nitrate, potassium phosphate, potassium sulphate, and potassium chloride; and 1 part by weight of a herbicide component (B) having a melting or softening point below 145° C and below that of component (A) when mixed therewith, said component (B) also having a solubility in water not exceeding 1g/liter at 20° C; wherein said herbicide component is selected from the group consisting of 2-tert-butyl-4,6-dinitro-5-methylphenyl acetate, 2-tert-butyl-4,6-dinitro-phenyl acetate, 2-tert-butyl-4,6-dinitrophenyl ethyl fumarate, 3-(4-bromo-3-chlorophenyl)-1-methoxy-1-methylurea, 3-(4-chlorophenyl)-1-methoxy-1-methylurea, isopropyl N-phenyl-carbamate, 2-chloro-N-isopropyl-acetanilide, and a triazine herbicide of the general formula:

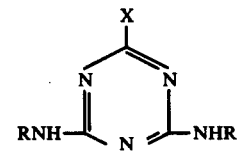

wherein X is OR or SR, the R groups being the same or different lower alkyl groups;
  b. thereafter extruding the dry mixture through a die at a temperature of 70° to 145° C whereby said herbicide component acts as a lubricant to permit ready extrusion of said fertilizer component in solid form and subsequently solidifies to bind said fertilizer component into a coherent extrudate.

2. The method of claim 1 wherein 1 to 30 parts by weight of plant fertilizer component (A) and 1 part of herbicide component (B) are used.

3. A method of making a plant fertilizer-herbicide composition of claim 1 wherein the herbicide is 2-tert-butyl-4,6-dinitro-5-methylphenyl acetate.

4. A method of making a plant fertilizer-herbicide composition which comprises:
  a. making a dry mixture of 1 to 100 parts by weight of a plant fertilizer component (A), said plant fertilizer component comprising urea or a mixture of urea and a phosphate or potassium salt; and 1 part by weight of a herbicide component (B) having a melting or softening point below 145° C and below that of component (A) when mixed with said component (B) also having a solubility in water not exceeding 1g/liter; said herbicide selected from the group consisting of compounds of the formula:

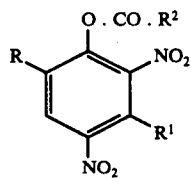

in which R is a branched butyl group; $R^1$ is a hydrogen atom or a methyl group; and $R^2$ is a group $R^3$ or $-CH=CH-CO_2R^3$, where $R^3$ is an alkyl, alkenyl or aryl group containing 1-6 carbon atoms optionally substituted with a halogen atom, alkoxyl group, or substituted amino group; and a triazine herbicide of the general formula:

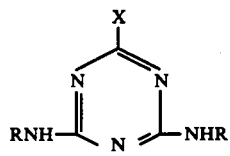

wherein X is OR or SR, the R groups being the same or different lower alkyl groups;

b. thereafter extruding the dry mixture through a die whereby said herbicide component acts as a lubricant to permit ready extrusion of said fertilizer component in solid form and subsequently solidifies to bind said fertilizer component into a coherent extrudate.

5. The process of claim 4 wherein the fertilizer component is urea.

6. The process of claim 4 wherein the fertilizer component is a mixture of urea, potassium nitrate, and monoammonium phosphate.

7. The process of claim 4 wherein the herbicide is selected from the group consisting of 2-tert-butyl-4,6-dinitro-5-methylphenyl acetate, 2-tert-butyl-4,6-dinitrophenyl acetate and 2-tert-butyl-4,6-dinitrophenyl ethyl fumarate.

8. The process of claim 4 wherein the heat necessary to cause flow of the herbicidal active compound is generated by friction in the extrusion process.

9. The process of claim 8 wherein a die is used in the extrusion, said die having a length to diameter ratio in the range of 1:1 to 15:1.

10. The process of claim 4 wherein the extrusion takes place at a temperature of from 75° to 95° C.

11. The process of claim 1 wherein the herbicide is selected from the group consisting of 3-(4-bromo-3-chloro-phenyl)-1-methoxy-1-methylurea, 3-(4-chlorophenyl)-1-methoxy-1-methylurea, isopropyl N-phenylcarbamate and 2-chloro-N-isopropyl-acetanilide.

* * * * *